ADAPTER SPINDLE FOR RECORD CHANGERS

Filed Aug. 4, 1964 2 Sheets-Sheet 1

Inventor
Richard W. Simpson
By Brown, Jackson, Boettcher & Dienner Attys

ADAPTER SPINDLE FOR RECORD CHANGERS

Filed Aug. 4, 1964 2 Sheets-Sheet 2

Inventor
Richard W. Simpson
By Brown, Jackson, Boettcher & Dienner Attys.

United States Patent Office 3,301,563

Patented Jan. 31, 1967

3,301,563

ADAPTER SPINDLE FOR RECORD CHANGERS

Richard W. Simpson, Stevensville, Mich., assignor to V-M Corporation, Benton Harbor, Mich., a corporation of Michigan Filed Aug. 4, 1964, Ser. No. 387,284
11 Claims. (Cl. 274—10)

The present invention relates to an adapter spindle for record changers. More specifically, the invention relates to a large diameter adapter spindle designed to slip over a conventional small diameter center spindle of a record changer to adapt the latter for handling 45 r.p.m. records of the type having a large centerhole.

It is well known in the art to provide an adapter spindle having an outer diameter of approximately 1.5 inches which can be mounted over the conventional small diameter center spindle of a record changer to permit the latter to accommodate 45 r.p.m. records of the type having a large centerhole. Such known adapter spindles are generally fixedly associated with the small diameter center spindle so that both are stationary while the record changer turntable rotates during playing of a record. It is further known to provide such adapter spindles with record feeding mechanism which is actuated by a record ejector lever or the like embodied in the small diameter center spindle.

Referring more specifically to the adapters used heretofore, such adapters generally comprise a cylindrical housing member which houses a pair of oppositely disposed record support or shelf members and a pair of oppositely disposed record separator blades, the blades being positioned above the shelves for extension into the space between the lowermost and the next-to-lowermost records in a stack of records supported on the shelf members. In addition, various types of actuating mechanism are provided for retracting the shelves and extending the blades so as to permit the lowermost record to drop to a turntable. In some commonly used adapters the shelves and blades move linearly, while in others they pivot about respective fixed axes, but substantially all such structures embody relatively complex actuating mechanism for controlling the movement of the shelf and blade members. Accordingly, the adapter spindles heretofore known are relatively expensive to manufacture, and in addition the actuating mechanism occupies considerable space within the housing so as to require the use of the large diameter cylindrical housing mentioned above rather than a more compact structure.

It is an object of the present invention to provide an improved adapter spindle which overcomes the above-mentioned disadvantages and which is unusually economical to manufacture.

A more specific object of the invention is to provide an improved adapter spindle which comprises an unusually small number of components which can be manufactured and assembled with a minimum of time and expense and yet which operates efficiently to perform the usual function of dropping one record at a time to a turntable upon actuation of ejecting means in the center spindle over which it is mounted.

Another object of the invention is to provide an adapter spindle as last-above mentioned in combination with a compact housing so as to reduce the overall size of the adapter.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of my invention.

Figure 1:
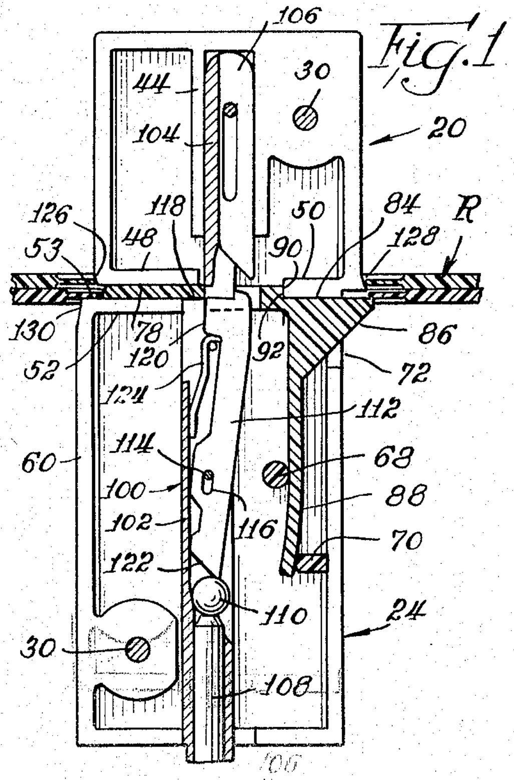
FIGURE 1 is a vertical sectional view, partly broken away, showing an adapter spindle constructed in accordance with the present invention mounted on the upper end of a conventional small diameter center spindle, the adapter spindle record actuator member being shown in its normal or rest position for supporting a stack of records of the type having a large centerhole.

Referring now to the drawings, FIGURES 1–4 show an adapter spindle 20 mounted over a small diameter center spindle 100 of a record changer so as to support a stack of records R of the type having a large centerhole and for dropping such records one at a time to a turntable (not shown) for playing. The adapter spindle includes a housing 24 which is comprised of a pair of half-sections 26 and 28 (see FIGURE 6) which may be secured together by any suitable means such as fastening screws, one of which is shown at 30. Since the two half-sections 26 and 28 are substantially identical, except as will be pointed out hereinafter, only the one half-section 26 will be described in detail in conjunction with FIGURE 5, and the structure of the other half section 28 will be identified with corresponding primed reference numerals. As shown in FIGURE 5, the housing section 26 comprises an upper portion 32 which is laterally offset from a lower portion 34. The upper housing portion 32 includes a top wall 36, a side wall 38, and oppositely disposed vertical end walls 40 and 42. A vertical rib 44 is formed on the side wall 38, and a vertical generally semi-circular recess 46 is formed in the rib 44. The lower end of the upper housing section 32 is defined by a pair of horizontal wall portions 48 and 50 which extend inwardly from the respective end walls 40 and 42 but leave open the space beneath the semi-circular recess 46.

The lower housing section 34 is offset laterally from the upper section 32 so as to provide an offset shelf which is defined by a horizontal wall portion 52, a record supporting portion of the offset shelf being indicated at 53. The wall 52 is parallel to the wall 48 and spaced therefrom to provide a horizontal slot 54 therebetween thus comprising an aperture in the spindle body. In addition, the lower housing section includes a horizontal wall portion 56 which is spaced beneath the wall 50 to provide a guide slot 58 therebetween thus forming a second aperture in the spindle body. The lower housing portion 34 further comprises the side wall 38 which is common to the entire half section 26, a pair of end walls 60 and 62, and a bottom wall 64, the latter having a cutout portion 66 to accommodate the center spindle 100. In the lower section 34 a pair of fixed studs or projecting members 68 and 70 are formed integral with the wall 38 so as to extend outwardly therefrom, and these projecting members serve to support a spring as will be described more fully hereinafter. However, it is important here to understand that the second half-section 28 of the adapter spindle body 24 is substantially the same in its dimensions as the section 26, except that the half-section 28 will be the reverse of the section 26 so as to mate therewith as shown in FIGURES 6–9, and the half-section 28 will not have studs thereon such as the projecting members 68 and 70. It will further be noted that the end wall 62 is cut away immediately beneath the horizontal wall portion 56 as shown at 72, whereby when the two half-sections 26 and 28 are joined together, there is provided a generally T-shaped opening 74 as shown in FIGURE 9, the upper portion of the opening being formed by the end of the guide slot 58.

FIGURE 5 further shows a unitary record actuator member 76 having a record pusher member 78 at one end thereof and record supporting means 80 at the opposite end. The record pusher 78 is a relatively thin flat member which is dimensioned so as to be slidable in the slot 54 defined between the horizontal wall members 48 and 52. The record supporting means 80 comprises an upper record supporting surface 84 beneath which there is an inclined portion 86 of reduced thickness, thereby forming a member which is generally T-shaped in vertical section so as to be slidable within the T-shaped aperture 74 in the housing as shown in FIGURE 9.

A flexible spring element 88 is provided which is integral with the actuator 76 and depends downwardly from the underside thereof for cooperation with the projecting spring supports 68 and 70. It will be seen that the record actuator member 76 is mounted in the housing 24 for horizontal rectilinear sliding movement therein. When thus mounted the pusher member 78 is slidable in the space 54 between the horizontal wall portions 48 and 52, and the side of the record supporting member 84 is slidable in the slot 58 formed between the horizontal wall portions 50 and 56, it being understood that the second half-section 28 of the housing provides similar complementary guide slots for guiding the actuator. FIGURES 1–4 show the manner in which the depending spring element 88 is positioned between the projecting members 68 and 70, and the latter members are positioned so as to bias the actuator 76 toward the right as viewed in the drawings. As best shown in FIGURE 5, the actuator 76 is provided at its upper surface with a shoulder or step 90 which cooperates with an inner end 92 of the wall portion 50 to limit the extent to which the spring 88 can move the actuator rearwardly or toward the right. Similarly, the underside of the actuator 76 is provided with a shoulder or step 94 which is engageable against an inner end 96 of the horizontal wall portion 52 so as to limit movement of the actuator toward the left as viewed in FIGURES 1–4, although the actuator will not normally be moved against the latter stop.

The record actuator 76 is provided with a vertical opening 98 which together with the opening 66 at the bottom of the adapter housing and the semi-circular recesses 46 and 46′ in the upper ends of the respective half-sections 26 and 28 permit the adapter spindle 20 to be mounted over the small diameter record changer spindle shown at 100. The small diameter spindle 100 is of conventional construction and comprises a main body portion 102, an upper offset portion 104, an upper slide 106, an axially movable actuator rod 108, a ball 110, and an ejector lever 112. The ejector lever 112 is pivotally mounted on a fixed cross pin 114 which projects through a short vertical slot 116 in the lever whereby the latter can pivot and also move vertically a limited amount.

It will be understood that when the small diameter spindle 100 is used without the adapter 20, a stack of records of the type having a small centerhole are supported on an offset shoulder 118 and stabilized thereon by a conventional overlying record support arm (not shown). The ejector lever 112 is shown in FIGURE 1 in its normal lowered clockwise position, and in order to actuate the lever to push a record from the shoulder 118 the actuator rod 108 is moved upwardly. Upon upward movement of the rod 108, the ball 110 engages the lower end of lever 112 and moves the latter to its raised position wherein the upper end of a push off portion 120 on the lever is disposed above the shoulder 118, and as the ball is moved further upwardly it engages an inclined surface 122 at the lower end of the lever 112 and pivots the latter counterclockwise in such a manner that the push off portion 120 engages the periphery of the small centerhole of the lowermost record in the stack to push the latter off the shoulder 118 causing the record to drop to the turntable. The weight of the remainder of the stack returns the lever 112 to its lowermost position, and a spring 124 returns the lever to its clockwise pivotal position.

Figure 3:
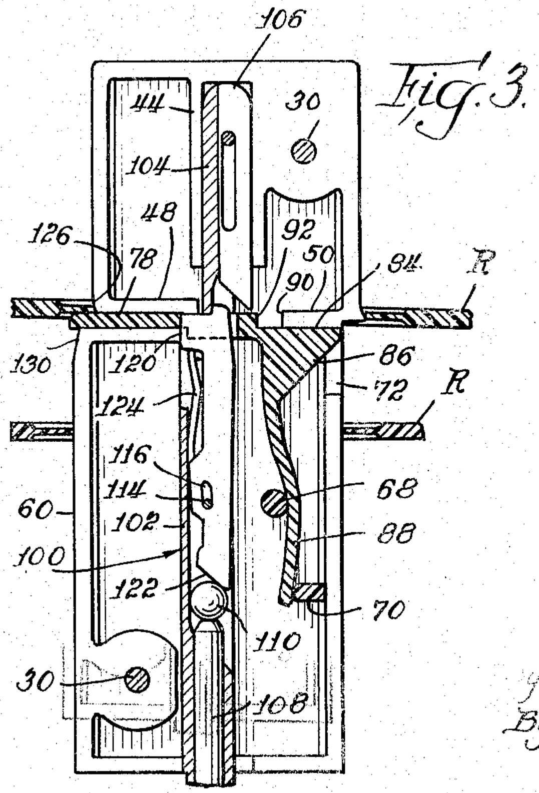
FIGURE 3 is a view similar to FIGURE 1 showing the record actuator member moved to its extreme left hand position so as to release the trailing centerhole edge of the lowermost record and thereby drop the record to a turntable.

When the adapter spindle 20 is mounted over the small diameter spindle 100, the offset upper end 104 of the inner spindle fits within the recess 46 and seats against the upper end thereof, a small clearance being provided between the lower end of the adapter spindle and the turntable (not shown). The center spindle 100 will project through the opening 98 in the record actuator member 76, and the adapter spindle 20 is positioned so that when the center spindle is actuated the push off portion 120 on the lever 112 will engage against the forward or left hand edge of the opening 98 and move the actuator 76 to its left hand position as shown in FIGURE 3. When the lever 112 is returned to its original position, the spring element 88 will return the actuator 76 to its right hand position as shown in FIGURE 1.

Referring again to FIGURE 5, it will be seen that a bevel or short downwardly and inwardly inclined surface 126 is formed on the housing end wall immediately above the offset shelf 53, and at the opposite end of the housing on the lower end of the wall 42 there is formed a short downwardly and outwardly inclined slope 128. The spindle housing is dimensioned so that the distance across the upper portion of the spindle body from the incline 126 to the slope 128 is slightly greater than the centerhole diameter of the records. For example, such distance may exceed the centerhole diameter by approximately 0.005 to 0.010 inch. Accordingly, a record on the spindle 20 cannot fall downwardly over the slope 128 except by first tilting downwardly past the incline 126 and thereafter falling past the slope 128. It will further be noted that the distance between the leading edge of the pusher 78 and the extreme rearward or right hand end of the record supporting member 84 is also slightly greater than the record centerhole diameter. For example, the latter distance may exceed the record centerhole diameter by approximately 0.015 inch. Consequently, a record R in position to be pushed by the pusher member 78, such as the lowermost record shown in FIGURE 1, cannot fall off of the rear of the record supporting surface 84 at the opposite end of the actuator 76.

In addition, it will be noted in FIGURE 5 that the housing end wall 60 is inclined at 130 so as to extend upwardly and inwardly immediately below the offset shelf 53, the purpose being to facilitate the downward tilting of a record when the latter is pushed from the shelf 53 by the pusher means 78. The pusher member 78 has a bevel formed on its outer upper edge at 132 whereby when it pushes a record from the shelf 53 the pusher will readily slide beneath the centerhole edge of the next higher record in the stack.

In operation, the normal or rest position of the record actuator member 76 is as shown in FIGURE 1, the actuator being yieldingly held in its right hand position by the spring element 88 with the actuator shoulder 90 engaged against the inner end 92 of the housing wall 50. In this position the pusher member 78 is retracted within the aperture or space 54 defined between the walls 48 and 52 so as to expose the shelf 53, and the record supporting member 84 is extended through the aperture defined between the walls 50 and 56 to project slightly outwardly beyond the slope 128 on the spindle body. Therefore, as a stack of records R is lowered on the upper end of the spindle body, the lowermost record will be positioned as shown in FIGURE 1 with one centerhole edge portion supported on the offset shelf 53 and the opposite centerhole edge portion supported on the member 84. It will be understood that the lowermost record will tilt in moving to such position, whereby one centerhole edge portion will first move down over the incline 126 to the shelf 53, and thereafter the opposite edge portion will be able to fall down past the slope 128.

Figure 2:
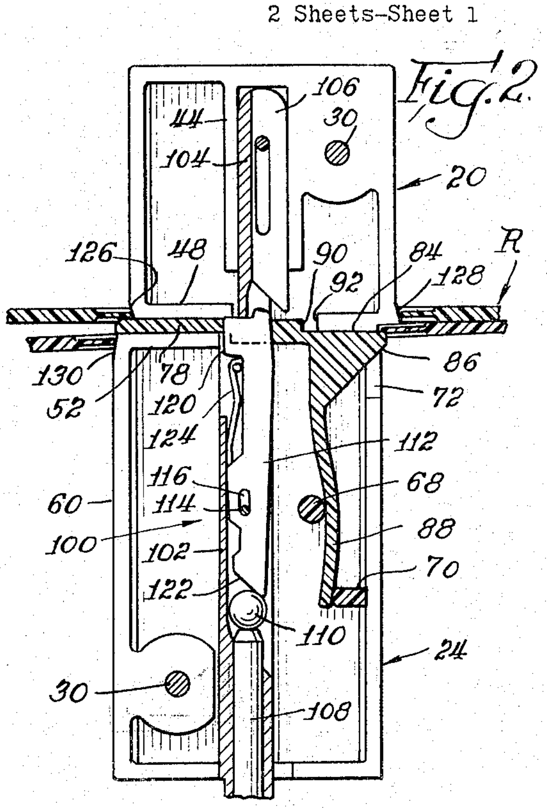
FIGURE 2 is a view similar to FIGURE 1 showing the record actuator member of the adapter spindle moved toward its left hand position so as to cause one centerhole edge of the lowermost record in the stack to be tilted downwardly beneath the front or pusher end of the actuator member.

In order to release the lowermost record R so as to drop the same to a turntable for playing, the actuator rod 108 is moved upwardly so as to move the lever 112 to the position shown in FIGURE 2, and the lever 112 will engage the forward edge of the opening 98 in the actuator 76 so as to move the latter to the position of FIGURE 2. The actuator 76 is thus moved to the left and the pusher member 78 thus slides outwardly over the offset shelf 53 so as to push the lowermost record from the shelf causing the adjacent centerhole edge thereof to fall down on the incline 130 of the housing end wall 60. While the lowermost record is being pushed by the pusher member 78, the record cannot fall off of the supporting member 84, due to the fact that the distance across the actuator from the forward or left-hand end of the pusher 78 to the rearward or right hand end of the supporting means 84 is slightly greater than the record centerhole diameter. However, as the edge of the record falls down on the incline 130 as shown in FIGURE 2, the pusher 78 continues to move past the edge of the record to the position of FIGURE 3, and the supporting member 84 is thus withdrawn from beneath the opposite record centerhole edge portion so as to release the record to a turntable. In the latter position of the actuator 76, the pusher member 78 is disposed beneath the centerhole edge of the next-to-lowermost record as shown in FIGURE 3, and because the distance across the adapter spindle body from the incline 126 to the slope 128 is slightly greater than the record centerhole diameter, the record surmounting the pusher 78 is prevented from falling.

Figure 4:
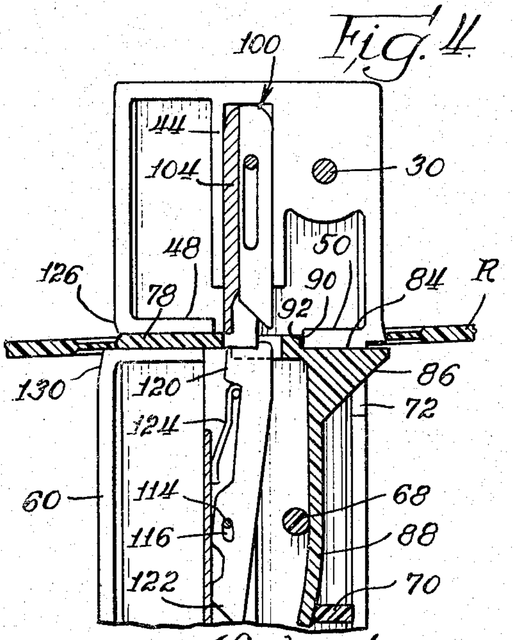
FIGURE 4 is a view similar to FIGURE 1 showing the record actuator member returned to its original or normal position so as to permit one centerhole edge portion of the next-to-lowermost record to drop downwardly onto an offset shelf provided by the adapter spindle body.
Figures 5, 6, 7, 8, 9:
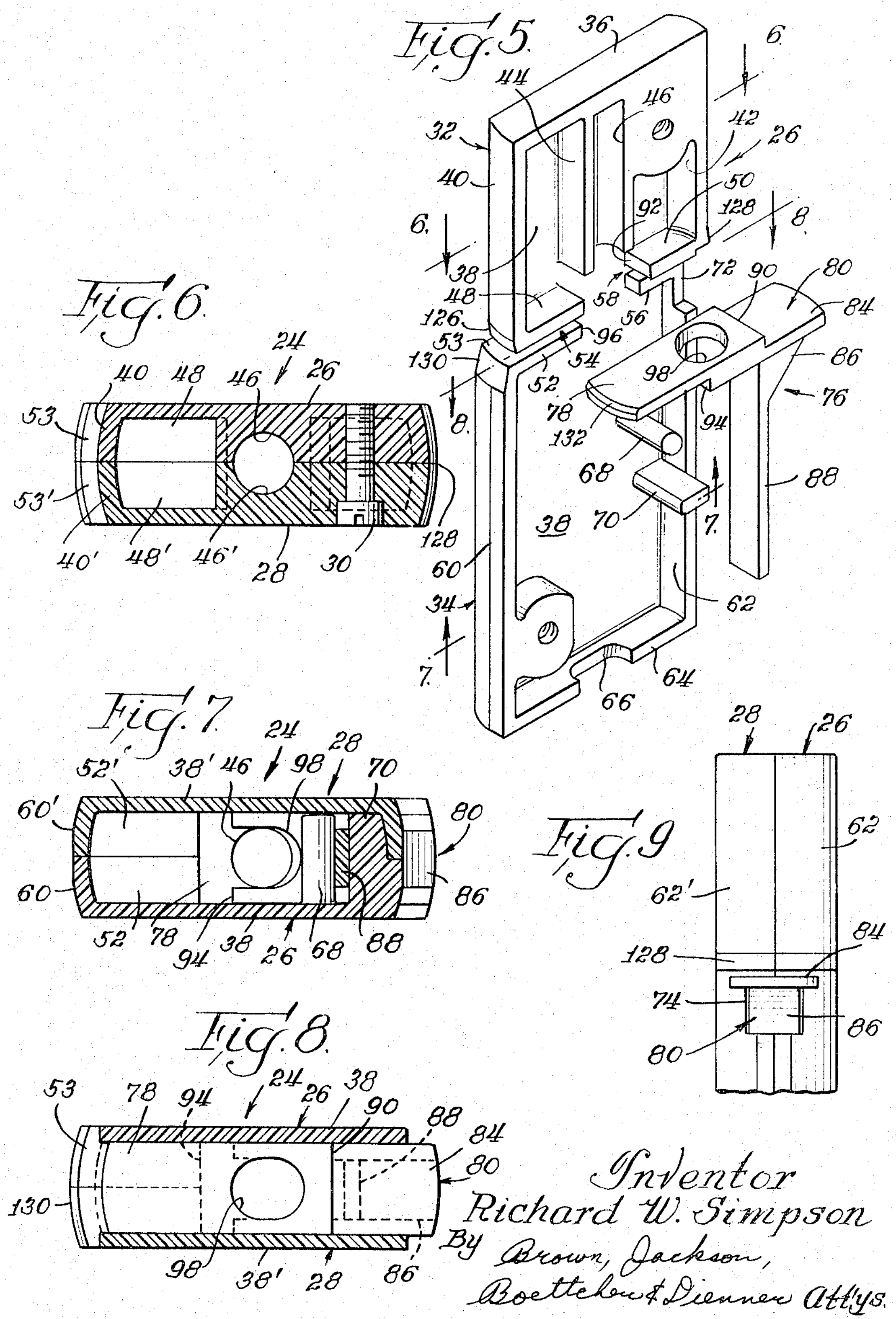
FIGURE 5 is an exploded perspective view showing a half section of an adapter spindle body and also the record actuator member which is associated therewith.
FIGURE 6 is a horizontal sectional view taken approximately along the line 6—6 of FIGURE 5, two half sections being shown secured together to form a spindle body member.
FIGURE 7 is a horizontal sectional view taken approximately along the line 7—7 of FIGURE 5 again showing two half sections fitted together to form a spindle body member.
FIGURE 8 is a horizontal sectional view again showing both half sections of the spindle body, the view being taken approximately along the line 8—8 of FIGURE 5.
FIGURE 9 is a fragmentary end elevational view of the adapter spindle showing the manner in which one end of a record actuator member is guided by the spindle body for horizontal sliding movement therein.

After the lowermost record has been dropped to a turntable, the actuator rod 108 is returned to its lower position thus causing the lever 112 to be returned to its lower clockwise position as shown in FIGURE 4. Consequently, the spring 88 returns the actuator 76 to the right to its normal or rest position as shown in FIGURE 4, and the pusher member 78 is thus retracted from beneath the record thereon thereby permitting the record to tilt and fall down to the offset shelf 53. With the record in a tilted position as in FIGURE 4, the record is free to fall down over the slope 128 onto the supporting means 84 which is now extended, and thus the records on the spindle are again positioned as shown in FIGURE 1. When the entire stack of records has been dropped seriatim to a turntable and played, the adapter spindle 20 can be removed from the center spindle 100 to permit removal of the played records.

It will be understood that the adapter spindle described herein is extremely simple in its construction and comprises very few components. That is, the spindle housing is a two piece member which may be screwed together as shown, or it may be snapped together or assembled by rivets or the like, the housing preferably being made of a plastic material. The record actuator is a unitary member in the sense that the pusher means at one end thereof and the record supporting means at the other end thereof comprise one integral component. As shown herein, the spring element 88 is also integral with the actuator, although a separate spring element may be provided if desired.

While I have illustrated my invention in a preferred form, I do not intend to be limited to that form, except insofar as the appended claims are so limited, since modifications coming within the scope of my invention will be readily suggested to others with my disclosure before them.

I claim:

1. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a unitary record actuator member mounted in said spindle body for horizontal rectilinear sliding movement therein, said actuator having pusher means at one end thereof slidable over a top surface of said offset shelf for engaging the periphery of the centerhole of the lowermost record supported on said shelf and further having record supporting means at the opposite end thereof positioned for engaging underneath the peripheral edge of the centerhole of the lowermost record supported on said spindle, and said actuator being movable by said record ejecting means of said center spindle between a first normal position wherein said record supporting means is extended beneath the peripheral edge of the centerhole of the lowermost record on the spindle and said pusher means is retracted relative to the adjacent edge of said lowermost record supported on said shelf to a second position wherein said pusher means is moved outwardly to push said lowermost record from said offset shelf and said record supporting means is retracted sufficiently to move from beneath the adjacent edge of said lowermost record, thereby to release said lowermost record to a turntable.

2. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a unitary record actuator member mounted in said spindle body for horizontal rectilinear sliding movement therein, said actuator having pusher means at one end thereof slidable over a top surface of said offset shelf for engaging the periphery of the center hole of the lowermost record supported on said shelf and further having record supporting means at the opposite end thereof positioned for engaging underneath the peripheral edge of the centerhole of the lowermost record supported on said spindle, and a portion of said actuator being disposed immediately adjacent said record ejecting means of said center spindle whereby upon actuation of said ejecting means the latter will engage and move said actuator from a first normal position wherein said record supporting means is extended beneath the peripheral edge of the centerhole of the lowermost record on the spindle and said pusher means is retracted relative to the adjacent edge of said lowermost record supported on said shelf to a second position wherein said pusher means is moved outwardly to push said lowermost record from said offset shelf and said record supporting means is retracted sufficiently to move from beneath the adjacent edge of said lowermost record, thereby to release said lowermost record to a turntable.

3. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a first aperture formed in said spindle body immediately above said offset shelf, a second aperture formed in said spindle body approximately opposite said first aperture, a unitary record actuator member mounted in said spindle body for horizontal rectilinear sliding movement therein, said actuator having pusher means at one end thereof adjacent said offset shelf and movable through said first aperture for engaging the periphery of the centerhole of the lowermost record supported on said shelf and further having record supporting means at the opposite end thereof adjacent said second aperture engaging underneath the peripheral edge of the centerhole of the lowermost record supported on said spindle, a portion of said actuator being disposed immediately adjacent said record ejecting means of said center spindle whereby upon actuation of said ejecting means the latter will engage and move said actuator from a first normal position wherein said record supporting means is operatively extended outwardly through said second aperture beneath the peripheral edge of the centerhole of the lowermost record on the spindle and said pusher means is substantially retracted within said first aperture to a second position wherein said pusher means is moved outwardly through said first aperture to push said lowermost record from said offset shelf and said record supporting means is substantially retracted sufficiently within said second aperture to move from beneath the adjacent edge of said lowermost record, thereby to release said lowermost record to a turntable.

4. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a first aperture formed in said spindle body immediately above said offset shelf, a second aperture formed in said spindle body approximately opposite said first aperture, a unitary record actuator member mounted in said spindle body for horizontal rectilinear sliding movement therein, said actuator having pusher means at one end thereof adjacent said offset shelf and movable through said first aperture for engaging the periphery of the centerhole of the lowermost record supported on said shelf and further having record supporting means at the opposite end thereof adjacent said second aperture engaging underneath the peripheral edge of the centerhole of the lowermost record supported on said spindle, a portion of said actuator being disposed immediately adjacent said record ejecting means of said center spindle whereby upon actuation of said ejecting means the latter will engage and move said actuator from a first normal position wherein said record supporting means is operatively extended outwardly through said second aperture beneath the peripheral edge of the centerhole of the lowermost record on the spindle and said pusher means is substantially retracted within said first aperture to a second position wherein said pusher means is moved outwardly through said first aperture to push said lowermost record from said offset shelf and said record supporting means is substantially retracted sufficiently within said second aperture to move from beneath the adjacent edge of said lowermost record, thereby to release said lowermost record to a turntable, and yieldable means associated with said actuator for returning the same to its first normal position upon release of said actuator by said record ejecting means.

5. The invention of claim 4 wherein said yieldable means comprises a flexible extension integral with said actuator.

6. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a first aperture formed in said spindle body immediately above said offset shelf, a second aperture formed in said spindle body approximately opposite said first aperture, a unitary record actuator member mounted in said spindle body for horizontal rectilinear sliding movement therein, said actuator having pusher means at one end thereof adjacent said offset shelf and movable through said first aperture for engaging the periphery of the centerhole of the lowermost record supported on said shelf and further having record supporting means at the opposite end thereof adjacent said second aperture engaging underneath the peripheral edge of the centerhole of the lowermost record supported on said spindle, said actuator being of such a length that the distance between a leading outer edge of said pusher means and an extreme outer edge portion of said supporting means is slightly greater than the centerhole diameter of said records whereby when a record is being pushed by said pusher means the opposite edge of said record cannot pass downwardly over said supporting means, and a portion of said actuator being disposed immediately adjacent said record ejecting means of said center spindle whereby upon actuation of said ejecting means the latter will engage and move said actuator from a first normal position wherein said record supporting means is operatively extended outwardly through said second aperture beneath the peripheral edge of the centerhole of the lowermost record on the spindle and said pusher means is substantially retracted within said first aperture to a second position wherein said pusher means is moved outwardly through said first aperture to push said lowermost record from said offset shelf and said record supporting means is substantially retracted sufficiently within said second aperture to move from beneath the adjacent edge of said lowermost record, thereby to release said lowermost record to a turntable.

7. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a first aperture formed in said spindle body immediately above said offset shelf, a second aperture formed in said spindle body approximately opposite said first aperture, a short downwardly and outwardly extending slope formed on said spindle body substantially immediately above said second aperture, said spindle body being dimensioned so that the distance between the outer portion of said slope and the extreme opposite portion of said spindle body is slightly greater than the centerhole diameter of said records whereby a record on said spindle must be tilted in order to move downwardly over said slope, said opposite portion of said spindle body being disposed substantially immediately above said first aperture, a unitary record actuator member mounted in said spindle body for horizontal rectilinear sliding movement therein, said actuator having pusher means at one end thereof adjacent said offset shelf and movable through said first aperture for engaging the periphery of the centerhole of the lowermost record supported on said shelf and further having record supporting means at the opposite end thereof adjacent said second aperture engaging underneath the peripheral edge of the centerhole of the lowermost record supported on said spindle, a portion of said actuator being disposed immediately adjacent said record ejecting means of said center spindle whereby upon actuation of said ejecting means the latter will engage and move said actuator from a first normal position wherein said record supporting means is operatively extended outwardly through said second aperture beneath the peripheral edge of the centerhole of the lowermost record on the spindle and said pusher means is substantially retracted within said first aperture to a second position wherein said pusher means is moved outwardly through said first aperture to push said lowermost record from said offset shelf and said record supporting means is substantially retracted sufficiently within said second aperture to move from beneath the adjacent edge of said lowermost record, thereby to release said lowermost record to a turntable.

8. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a first aperture formed in said spindle body immediately above said offset shelf, a second aperture formed in said spindle body approximately opposite said first aperture, a short downwardly and outwardly extending slope formed on said spindle body substantially immediately above said second aperture, said spindle body being dimensioned so that the distance between the outer portion of said slope and the extreme opposite portion of said spindle body is slightly greater than the centerhole diameter of said records whereby a record on said spindle must be tilted in order to move downwardly over said slope, said opposite portion of said spindle body being disposed substantially immediately above said first aperture, a unitary record actuator member mounted in said spindle body for horizontal rectilinear sliding movement therein, said actuator having pusher means at one end thereof adjacent said offset shelf and movable through said first aperture for engaging the periphery of the centerhole of the lowermost record supported on said shelf and further having record supporting means at the opposite end thereof adjacent said second aperture engaging underneath the peripheral edge of the centerhole of the lowermost record supported on said spindle, said actuator being of such a length that the distance between a leading outer edge of said pusher means and an extreme outer edge portion of said supporting means is slightly greater than the centerhole diameter of said records whereby when a record is being pushed by said pusher means the opposite centerhole edge of said record cannot pass downwardly over said supporting means, and a portion of said actuator being disposed immediately adjacent said record ejecting means of said center spindle whereby upon actuation of said ejecting means the latter will engage and move said actuator from a first normal position wherein said record supporting means is operatively extended outwardly through said second aperture beneath the peripheral edge of the centerhole of the lowermost record on the spindle and said pusher means is substantially retracted within said first aperture to a second position wherein said pusher means is moved outwardly through said first aperture to push said lowermost record from said offset shelf and said record supporting means is substantially retracted sufficiently within said second aperture to move from beneath the adjacent edge of said lowermost record, thereby to release said lowermost record to a turntable.

9. In an adapter spindle of the type designed to slip over a small diameter center spindle of a record changer for supporting a stack of large centerhole records and for dropping such records one at a time to a turntable for playing, which small diameter center spindle is of the type having record ejecting means embodied therein, the improvement comprising, in combination, an adapter spindle body over which a plurality of large centerhole records are adapted to be mounted, said body having an offset shelf formed at one side thereof for supporting one centerhole edge portion of the lowermost record in a stack of records on the spindle, a first aperture formed in said spindle body immediately above said offset shelf, a second aperture formed in said spindle body approximately opposite said first aperture, a unitary record actuator member mounted in said spindle body for horizontal rectilinear sliding movement therein, said actuator having pusher means at one end thereof positioned for sliding movement through said first aperture adjacent a top surface of said offset shelf for engaging the periphery of the centerhole of the lowermost record supported on said shelf and further having record supporting means at the opposite end thereof adjacent said second aperture engaging underneath the peripheral edge of the centerhole of the lowermost record supported on said spindle, said record supporting means having a top supporting surface approximately in the same horizontal plane as said top surface of said offset shelf whereby when a stack of records is supported on said spindle with the lowermost record supported at the periphery of its centerhole with one edge resting on said shelf and the opposite edge resting on said top supporting surface of said record supporting means said records will be disposed horizontally, and a portion of said actuator being disposed immediately adjacent said record ejecting means of said center spindle whereby upon actuation of said ejecting means the latter will engage and move said actuator from a first normal position wherein said record supporting means is operatively extended outwardly through said second aperture beneath the peripheral edge of the centerhole of the lowermost record on the spindle and said pusher means is substantially retracted within said first aperture to a second position wherein said pusher means is moved outwardly through said first aperture to push said lowermost record from said offset shelf and said record supporting means is substantially retracted sufficiently within said second aperture to move from beneath the adjacent edge of said lowermost record, thereby to release said lowermost record to a turntable.

10. The invention of claim 8 wherein said record supporting means has a top supporting surface approximately in the same horizontal plane as a top surface of said offset shelf whereby when a stack of records is supported on said spindle with the lowermost record supported at the periphery of its centerhole with one edge resting on said shelf and the opposite edge resting on said top supporting surface of said record supporting means said records will be disposed horizontally.

11. The invention of claim 8 wherein said opposite portion of said spindle body which is disposed substantially immediately above said first aperture comprises an inclined surface which slopes downwardly and somewhat inwardly to permit an adjacent portion of a record disposed on top of said pusher means to tilt downwardly onto said offset shelf when said actuator is moved to said first normal position so as to substantially retract said pusher means within said first aperture.

References Cited by the Examiner

UNITED STATES PATENTS

| | | | |
|---|---|---|---|
| 2,761,687 | 9/1956 | Da Costa | 274—10 |
| 3,191,943 | 6/1965 | Reed | 274—10 |

JOHN M. HORAN, *Primary Examiner.*

J. F. PETERS, *Assistant Examiner.*